US008225387B2

(12) United States Patent
Mardikar et al.

(10) Patent No.: US 8,225,387 B2
(45) Date of Patent: *Jul. 17, 2012

(54) METHOD AND SYSTEM FOR ACCESS AUTHENTICATION

(75) Inventors: Upendra Sharadchandra Mardikar, San Jose, CA (US); Liam Sean Lynch, San Jose, CA (US)

(73) Assignee: eBay Inc., San Jose, CA (US)

( * ) Notice: Subject to any disclaimer, the term of this patent is extended or adjusted under 35 U.S.C. 154(b) by 282 days.

This patent is subject to a terminal disclaimer.

(21) Appl. No.: 12/638,931

(22) Filed: Dec. 15, 2009

(65) Prior Publication Data
US 2010/0095124 A1 Apr. 15, 2010

Related U.S. Application Data

(63) Continuation of application No. 11/496,673, filed on Jul. 31, 2006, now Pat. No. 7,673,332.

(51) Int. Cl.
*H04L 29/06* (2006.01)
*G06F 11/30* (2006.01)
(52) U.S. Cl. ............. 726/9; 726/2; 726/3; 726/4; 726/5; 726/6; 713/182; 713/183; 713/184; 713/185; 713/186
(58) Field of Classification Search ............... 726/9
See application file for complete search history.

(56) References Cited

U.S. PATENT DOCUMENTS

| 5,142,578 A * | 8/1992 | Matyas et al. ............... 380/280 |
| 7,673,332 B2 | 3/2010 | Mardikar et al. |
| 2003/0163567 A1 | 8/2003 | McMorris et al. |
| 2006/0016871 A1 * | 1/2006 | Bonalle et al. ............... 235/380 |
| 2006/0031592 A1 * | 2/2006 | Hinton et al. ............... 709/250 |
| 2008/0028228 A1 | 1/2008 | Mardikar et al. |

FOREIGN PATENT DOCUMENTS

| WO | WO-2008016567 A2 | 2/2008 |
| WO | WO-2008016567 A3 | 2/2008 |

OTHER PUBLICATIONS

"U.S. Appl. No. 11/496,673, Advisory Action mailed Aug. 14, 2009", 3 pgs.
"U.S. Appl. No. 11/496,673, Final Office Action mailed May 1, 2009", 22 pgs.

(Continued)

*Primary Examiner* — Longbit Chai
(74) *Attorney, Agent, or Firm* — Schwegman, Lundberg & Woessner, P.A.

(57) ABSTRACT

A method and a system for access authentication. A shared services resource includes a second factor authentication module. At least one network resource each include a first factor authentication module. A trusted computing base communicates with the shared services and the at least one network resource through a pipe. An assertion may be obtained on a trusted computing base for accessing at least one network resource. At least one of the at least one network resource may be accessed with the trusted computing base when the assertion has been obtained by the trusted computing base and is valid.

19 Claims, 14 Drawing Sheets

OTHER PUBLICATIONS

"U.S. Appl. No. 11/496,673, Non-Final Office Action mailed Oct. 10, 2008", 14 pgs.

"U.S. Appl. No. 11/496,673, Notice of Allowance mailed Oct. 21, 2009", 17 pgs.

"U.S. Appl. No. 11/496,673, Response filed Apr. 9, 2009 to Non Final Office Action mailed Oct. 10, 2008", 15 pgs.

"U.S. Appl. No. 11/496,673, Response filed Aug. 3, 2009 to Final Office Action mailed May 1, 2009", 13 pgs.

"International Application Serial No. PCT/US2007/017031, Search Report mailed Jul. 15, 2008", 4 pgs.

"International Application Serial No. PCT/US2007/017031, Written Opinion mailed Jul. 15, 2008", 9 Pgs.

* cited by examiner

METHOD AND SYSTEM FOR ACCESS AUTHENTICATION

RELATED APPLICATIONS

This application is a continuation of U.S. application Ser. No. 11/496,673, filed Jul. 31, 2006, now U.S. Pat. No. 7,673,332, entitled "Method and System for Access Authentication," which is incorporated herein by reference in its entirety.

FIELD

The present application relates generally to the technical field of data-processing and, in one specific example, to a method and system for access authentication.

BACKGROUND

Persons that access network resources, such as websites, may conduct e-commerce transactions and be involved in other communications where information is transmitted over a network. Transmitting of such information over the network may expose the user to risks of third parties that may seek unauthorized access for nefarious purposes. The third parties may seek such access by obtaining a password or other login information for the network resources.

Operators of the network resources may seek ways to secure their network resources to prevent activity that is not authorized by the users. For example, operators may require users to meeting a password criteria such as being of a certain length and/or including special characters or to frequently change their passwords.

BRIEF DESCRIPTION OF THE DRAWINGS

Some embodiments are illustrated by way of example and not limitation in the figures of the accompanying drawings in which.

DETAILED DESCRIPTION

Example methods and systems for access authentication are described. In the following description, for purposes of explanation, numerous specific details are set forth in order to provide a thorough understanding of example embodiments. It will be evident, however, to one skilled in the art that the present invention may be practiced without these specific details A trusted computing base (TCB) may be used to access one or more network resources and an optional shared services resource over a network. The trusted computing base may be coupled to a computing system, such that a TCB agent of the trusted computing base may be in communication with a host agent of the computing system. A pipe may be established between the TCB agent and the one or more network resources and an optional shared services resource. As used herein, a pipe may be a connection for data transfer between computing devices. The network resources may include a first factor authentication module and an optional second factor authentication module, and the shared services resource may include a second factor authentication module and an optional first factor authentication module. A second factor authentication or an assertion may be authenticated to provide access control to the one or more network resources.

Figure 1:
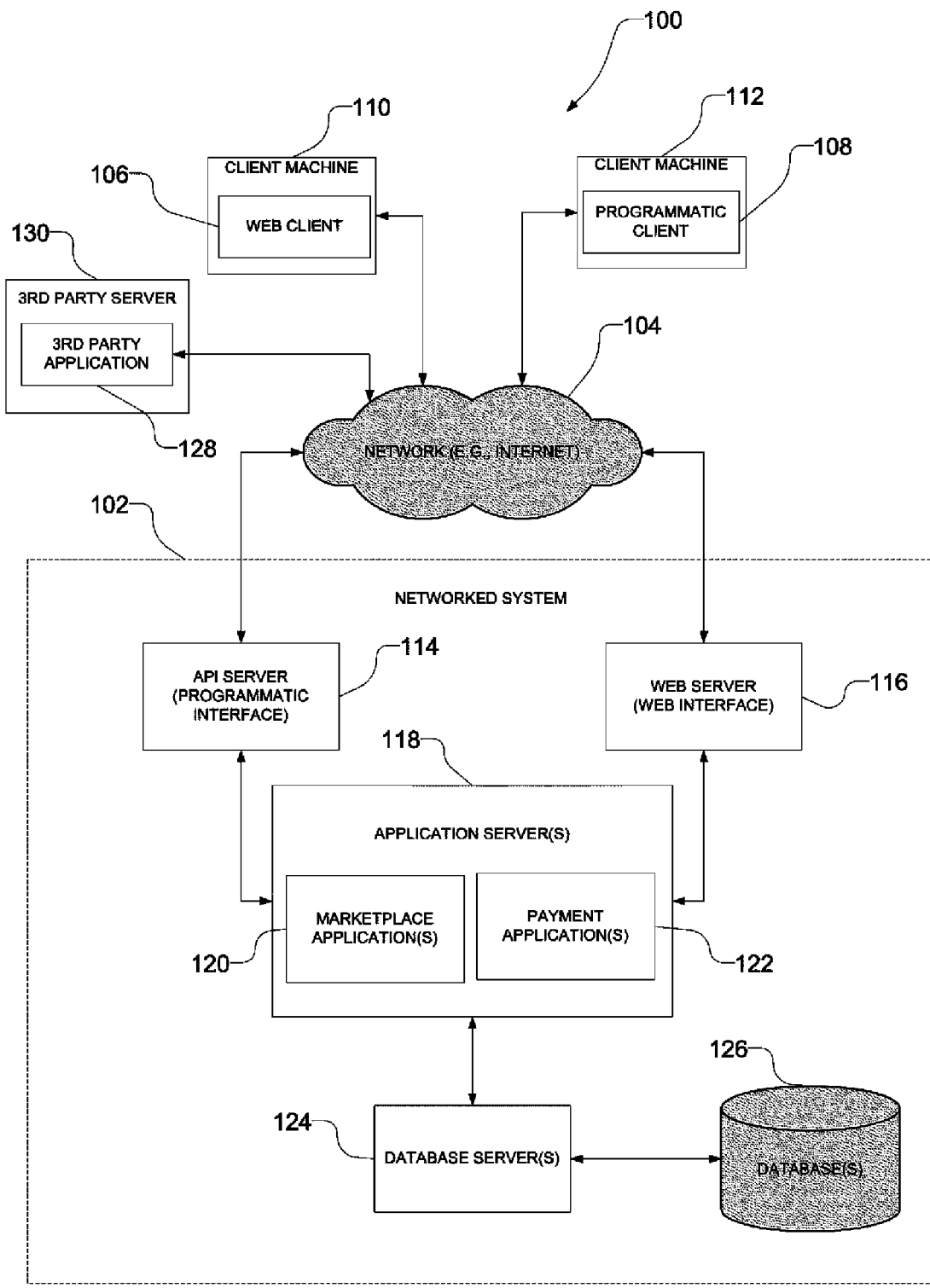
FIG. 1 is a network diagram depicting a network system, according to one embodiment, having a client server architecture configured for exchanging data over a network.

The use of the method and system may enable enhanced authentication for access, such as transactions that a user may have with network resources such as websites. For example, the enhanced authentication may increase the probability of detecting unauthorized account usage of the user of the TCB. The enhanced authentication may also increase the difficulty in gaining access to an account of the user with the network resource. The method and system may also enable the use of a single password to access multiple network resources FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112.

An Application Programming Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for items (e.g., products or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
FIG. 2 is a block diagram illustrating an example embodiment of multiple network and marketplace applications, which are provided as part of the network-based marketplace.

FIG. 2 is block diagram illustrating multiple applications 120 and 122 that, in one example embodiment, are provided as part of the networked system 102. The applications 120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access server one or more databases 126 via the database servers 128.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or inventory data structures according to which listings may be classified within the networked system 102. Various other navigation applications may be provided to supplement the search and browsing applications.

In order to make listings, available via the networked system 102, as visually informing and attractive as possible, the marketplace applications 120 may include one or more imaging applications 216 utilizing which users may upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers conveniently to author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such messages for example advising users regarding the status of listings at the networked system 102 (e.g., providing "outbid" notices to bidders during an auction process or to provide promotional and merchandising information to users). Respective messaging applications 228 may utilize any one have a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 80 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotions points for each transaction established and/or concluded with a particular seller, and be offered a reward for which accumulated loyalty points can be redeemed.

Figure 3:
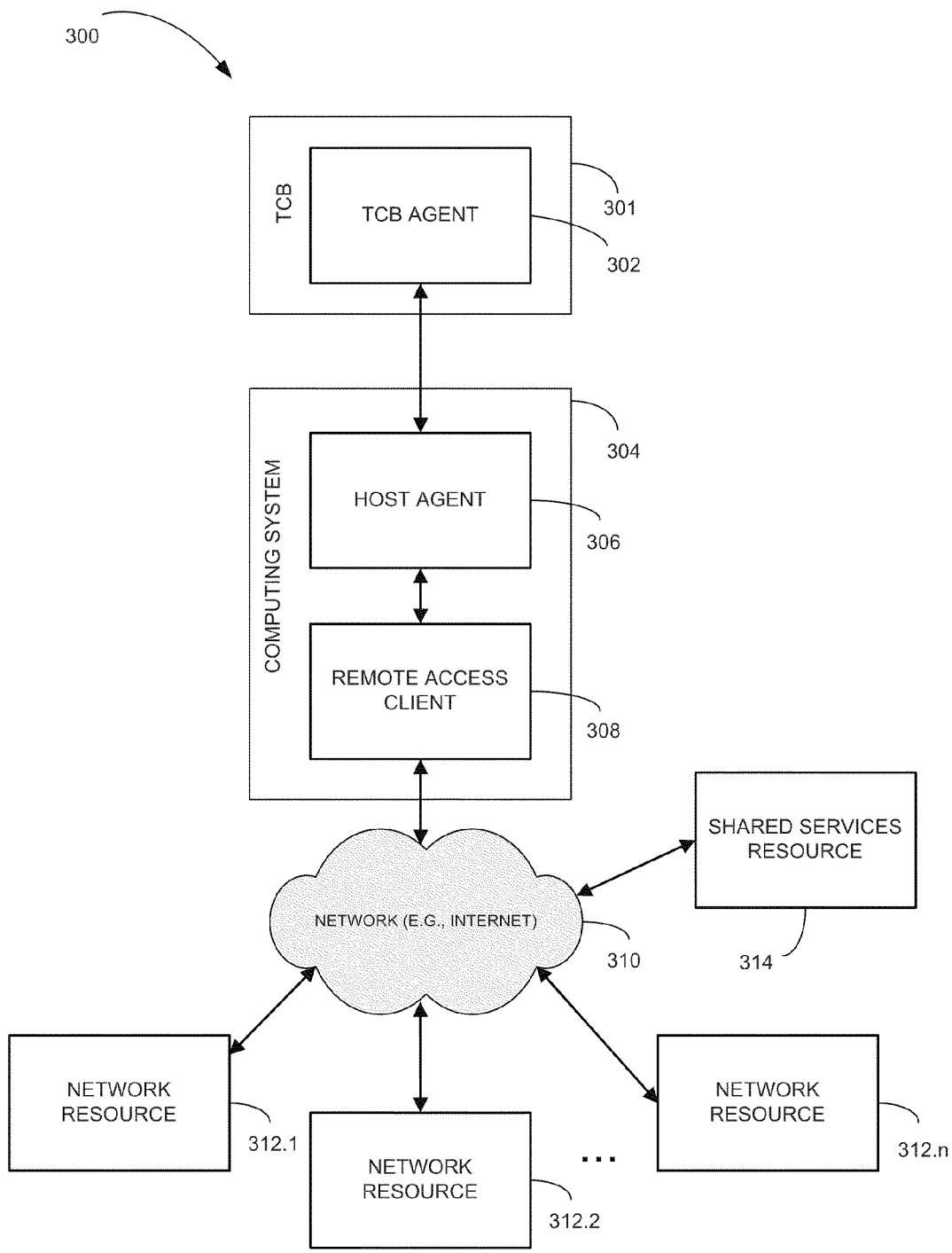
FIG. 3 is a block diagram of an example system for network resource access.

Referring to FIG. 3, a system 300 for network resource access according to an example embodiment is shown. A trusted computing base (TCB) 301 may communicate with a computing system 304 through a TCB agent 302 and a host agent 306 respectively.

The TCB 301 may be implemented in software, hardware, or a combination of hardware and software. For example, the TCB 301 may be implemented as a token, a smart card, a flash memory device, a universal serial bus (USB) device, a dongle, a digital music player, and the like.

In an example embodiment, the TCB 301 may manage credentials for a user of the TCB 301. For example, the user may decide on the credentials to include on the TCB 301 to enable connections to one or more network resources 312.1-312.$n$ and/or a shared services resource 314.

In an example embodiment, the TCB agent 302 may be installed on the TCB 301 prior to distribution to a user of the TCB 301. In an example embodiment, the TCB agent 302 may be installed by a user of the TCB 301, such as from data stored on a CD-ROM or downloaded from a network resource 312.

The host agent 306 may communicate with the TCB agent 302 on the TCB 301 and a remote access client 308 on a computing system 304. In an example embodiment, the remote access client 308 may enable the computing system 304 to access the one or more network resources 312.1-312.$n$ on a network 310. In an example embodiment, the remote access client 308 may enable the computing system 304 to access the one or more network resources 312.1-312.$n$ and the shared services resource 314 on the network 310.

The remote access client 308 may include a web client 106 or a programmatic client (see FIG. 1). Examples of the remote access client 308 include a web browser, a financial agent (e.g., an Internet wallet), a communication agent (e.g., an instant messenger), a telecommunication agent (e.g., for conducting voice over internet protocol) or a combination thereof. In an example embodiment, the remote access client 308 may be a SKYPE agent by Skype Limited and the financial agent may be Yahoo! Wallet by Yahoo! Inc.

The remote access client 308 may communicate over a network 310 with the network resources 312.1-312.$n$. In an example embodiment, the network resources 312.1-312.$n$ may include web pages, websites, telecommunication agents and the like. For example the network resources 312-312.$n$ may include the networked system 102 (see FIG. 1). In an example embodiment, the network 310 may include the network 104 (see FIG. 1).

In an example embodiment, the host agent 306 may be a first telecommunication agent and the network resources 312.1-312.$n$ may also be telecommunication agents. In an example embodiment, the shared services resource 314 may enable use of a shared infrastructure with the network resources 312.1-312.$n$.

Figure 4:
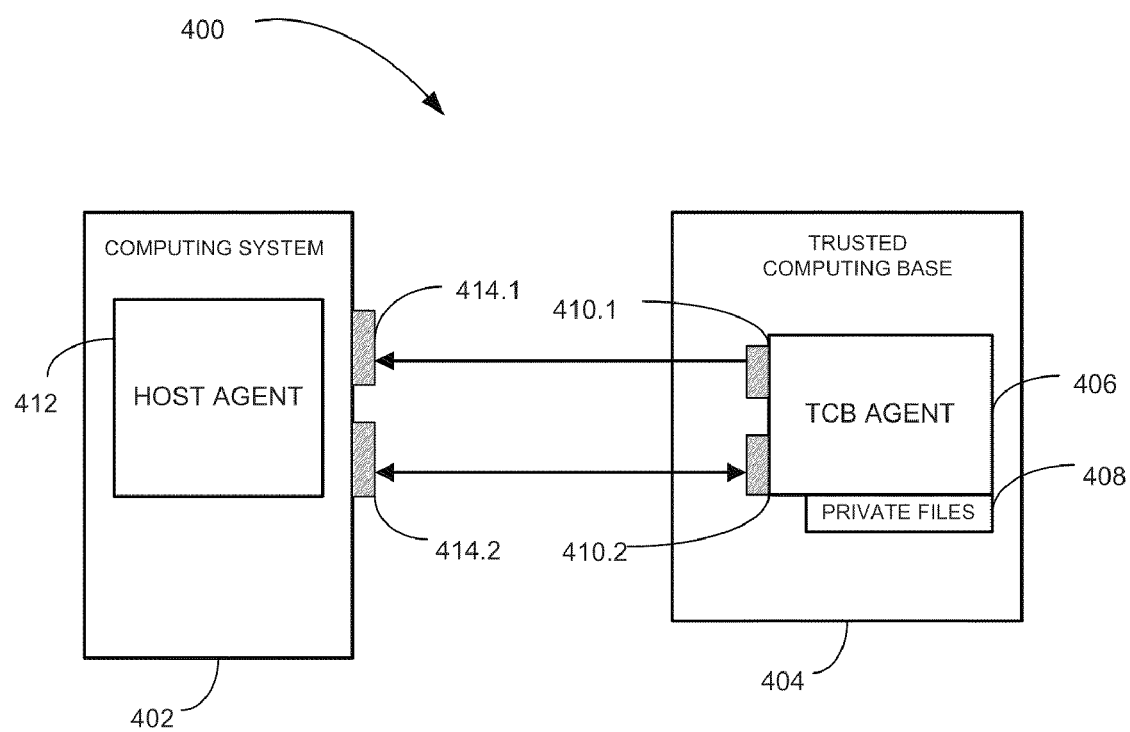
FIG. 4 is a block diagram of an example system for communicating between a computing system and a TCB.

Referring to FIG. 4, a system 400 for communicating between a computing system 402 and a TCB 404 to an example embodiment is shown. In an example embodiment, the computing system 304 may include the computing system 402 and the host agent 306 may include the host agent 412

(see FIG. 3). In an example embodiment, the TCB 301 may include the TCB 404 and the TCB agent 302 may include the TCB agent 406 (see FIG. 3).

The computing system 402 may include a computing interface 414.1, 414.2 and the TCB 404 may include a TCB communication interface 410.1, 410.2. The TCB 404 may communicate through the TCB communication interface 410.1, 410.2 with the computing interface 414.1, 414.2 of the computing system 402. In an example embodiment, the TCB communication interface 410.1, 410.2 and the computing interface 414.1, 414.2 may include hardware, software or a combination of software and hardware. For example, the TCB communication interface 410.1, 410.2 and the computing interface 414.1, 414.2 may include universal serial bus (USB), IEEE 1394 FIREWIRE, and other wired and wireless communication interface.

In an example embodiment, the TCB 404 may dock with computing system 402. In an example embodiment, TCB 404 may include a communication layer to enable communications with the computing system 402. In an example embodiment, the TCB 404 may only communicate with the computing system 402 locally, such as through a port 4116 of the computing system 402.

The TCB agent 406 may include access to private files 408 stored on the TCB 404. The private files may include a private key, user login information for an operator of the TCB 404, a one-time password (OTP) generation agent, a private queue of a certificate, login credentials, private keys, pins, uniform resource locators (URLs), and the like. In an example embodiment, the private files may not normally be accessed except by the TCB agent 406. In an example embodiment, the TCB 404 may be federal information processing standards (FIPS) compliant.

In an example embodiment, the TCB 404 may be a removable device and can connect to any computing system 402 with the computing interface 414.1, 414.2. For example, the TCB 404 may not be tied to a single computing system 402 and can be moved to any number of other computing systems 402 on the network 104, 310 (see FIGS. 1 and 3).

Figure 5:
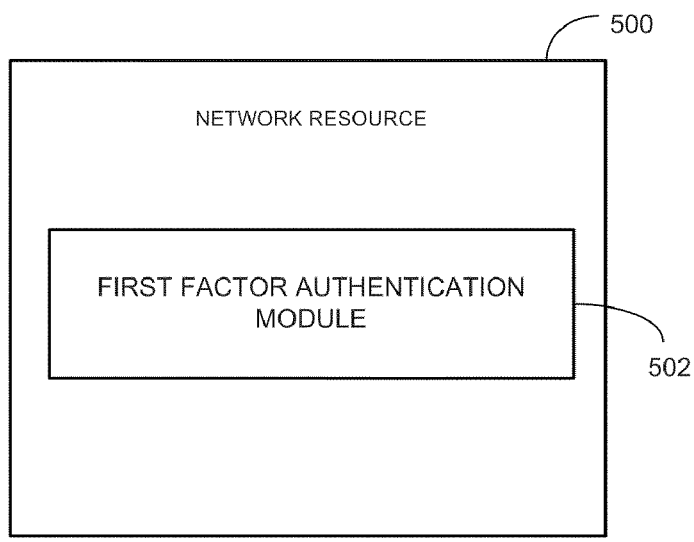
FIG. 5 is a block diagram of an example network resource.

Referring to FIG. 5, an example embodiment of a network resource 500 is shown. In an example embodiment, the network resources 312.1-312.n (see FIG. 3) may include the network resource 500.

The network resource 500 may include a first factor authentication module 502. The first factor authentication module may seek at least a first factor authentication to enable a user to access the network resource 500. For example, the first factor authentication may be user login information, such that a user name and password (or pin) are provided to satisfy the first factor authentication module 502. In an example embodiment, the TCB agent 302 (see FIG. 3) may seek re-verification of a first factor authentication after an access time period expires.

Figure 6:
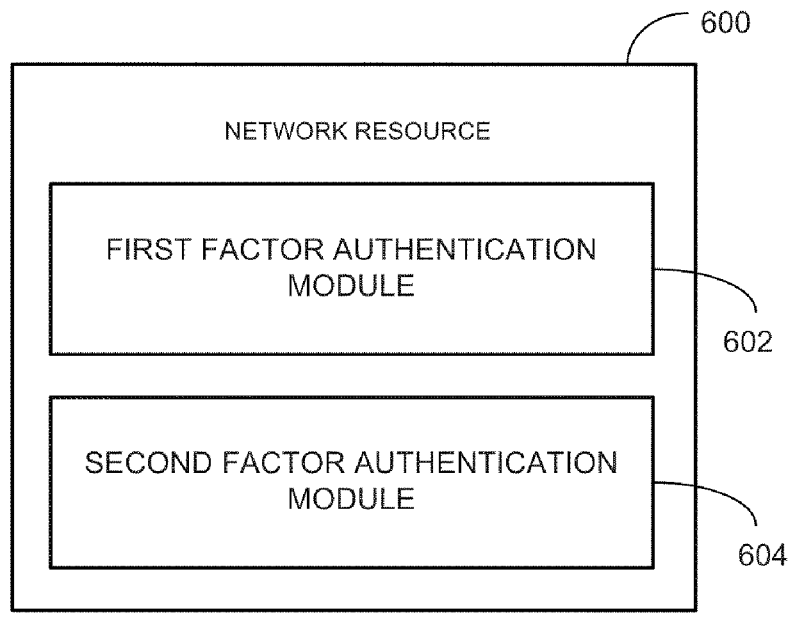
FIG. 6 is a block diagram of an example network resource.

Referring to FIG. 6, an example embodiment of a network resource 600 is shown. In an example embodiment, the network resources 312.1-312.n (see FIG. 3) may include the network resource 600.

The network resource 600 may include a first factor authentication module 502. In an example embodiment, the first factor authentication module 602 may be the first factor authentication module 502 (see FIG. 5).

The network resource 600 may include a second factor authentication module 604. The second factor authentication module may seek a second factor authentication to enable a user to access the network resource 600. For example, the second factor authentication may be a one time password (OTP), a certificate, biometrics, credentials and the like.

Figure 7:
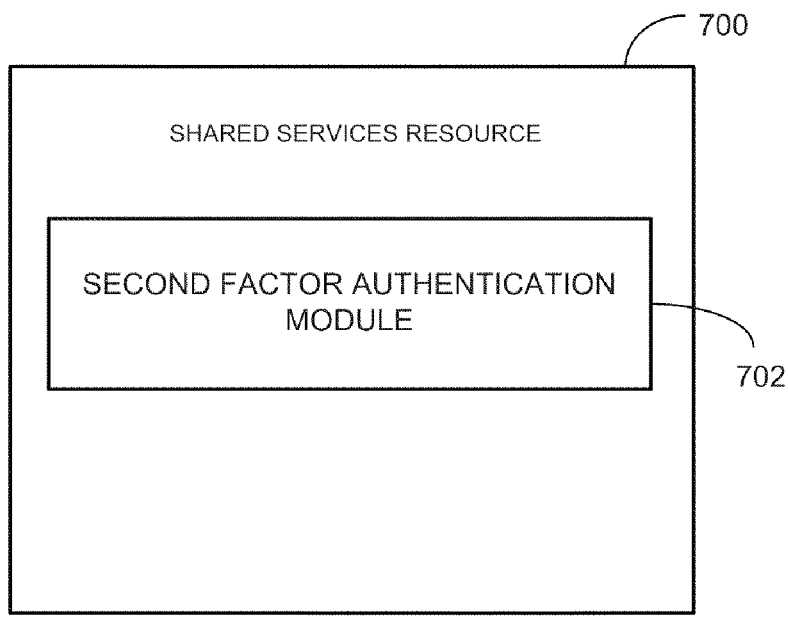
FIG. 7 is a block diagram of an example shared services resource.

Referring to FIG. 7, an example embodiment of a shared services resource 700 is shown. The shared services resource 700 may include a second factor authentication module 702. In an example embodiment, the second factor authentication module 702 may be the second factor authentication module 604 (see FIG. 6).

In an example embodiment, the shared services resource 700 may further include a first factor authentication module (not shown). In an example embodiment, the use of the shared services resource 314 may enable a user of TCB 301, 404 to access the network resources 312.1-312.n, 500, 600 (see FIGS. 3-6).

Figure 8:
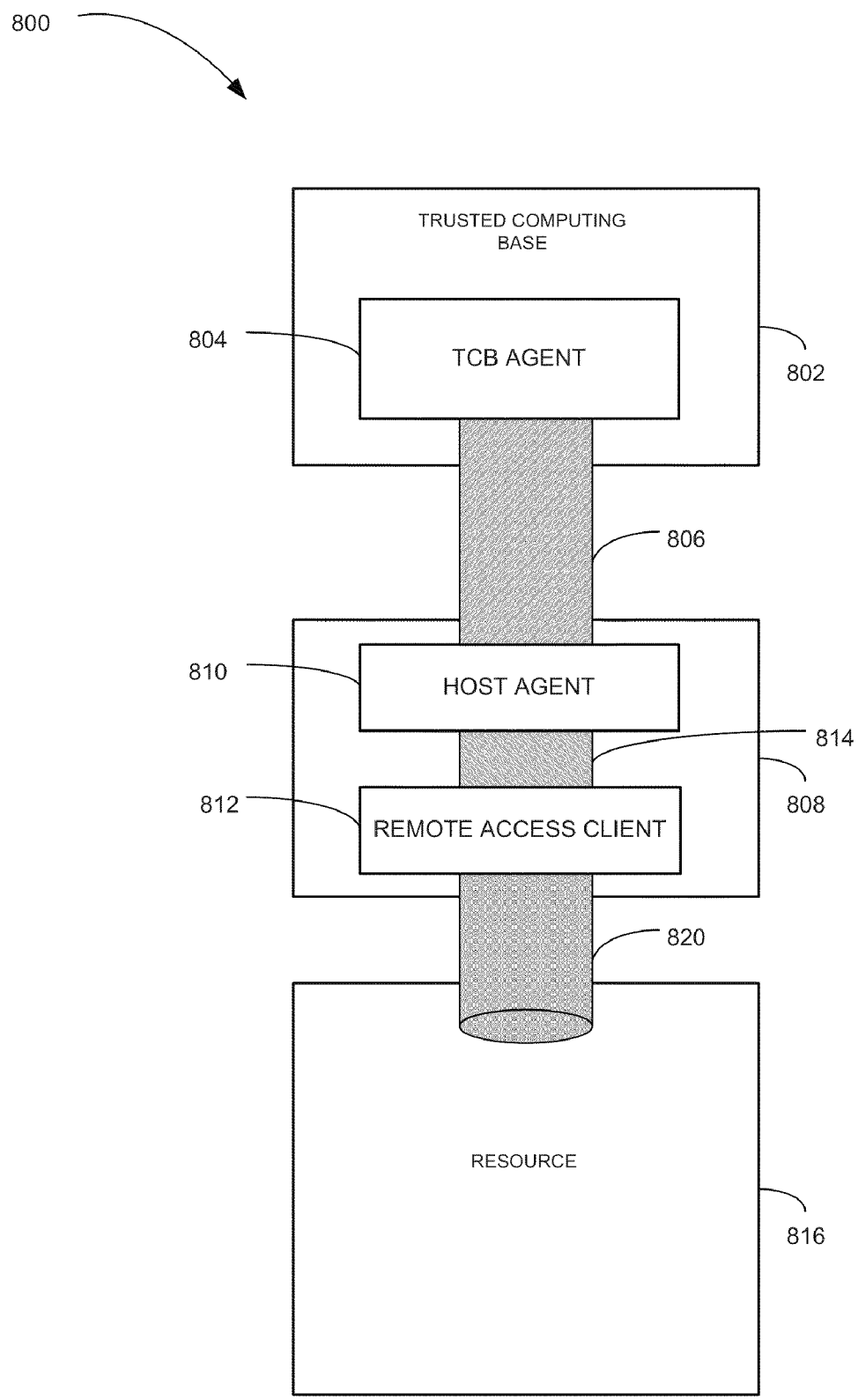
FIG. 8 is a block diagram of an example system for accessing a resource through a pipe.

Referring to FIG. 8, a system 800 for accessing a resource 816 through a pipe is shown. In an example embodiment, the resource 816 may be the network resource 312.1-312.n, 480, 600 (see FIGS. 3 and 4). In an example embodiment, the resource 816 may be the shared services resource 314, 700.

A TCB 802 may be coupled to a computing system 808 and communicate through a first pipe 806. In an example embodiment, the TCB 802 may be the TCB 301, 404 (see FIGS. 3 and 4). In an example embodiment, the computing system 808 may be the computing system 304 (see FIG. 3).

The TCB 802 may utilize a TCB agent 804 to communicate through a first pipe 806 with a host agent 810. In an example embodiment, the TCB agent 804 may be the TCB agent 302, 406 and the host agent 810 may be the host agent 306, 412 (see FIGS. 3 and 4).

The host agent 810 may communicate with a remote access client 812 through a second pipe 814 on the computing system 808. In an example embodiment, the remote access client 812 may be a programmatic client 108 or web client 106 (see FIG. 1).

The remote access client 812 may communicate with the resource 816 through a third pipe 820. In an example embodiment, the first pipe 806, the second pipe 814 and the third pipe 820 may be utilized together to enable communication between the TCB 802, remote access client 812 and the resource 816.

Figure 9:
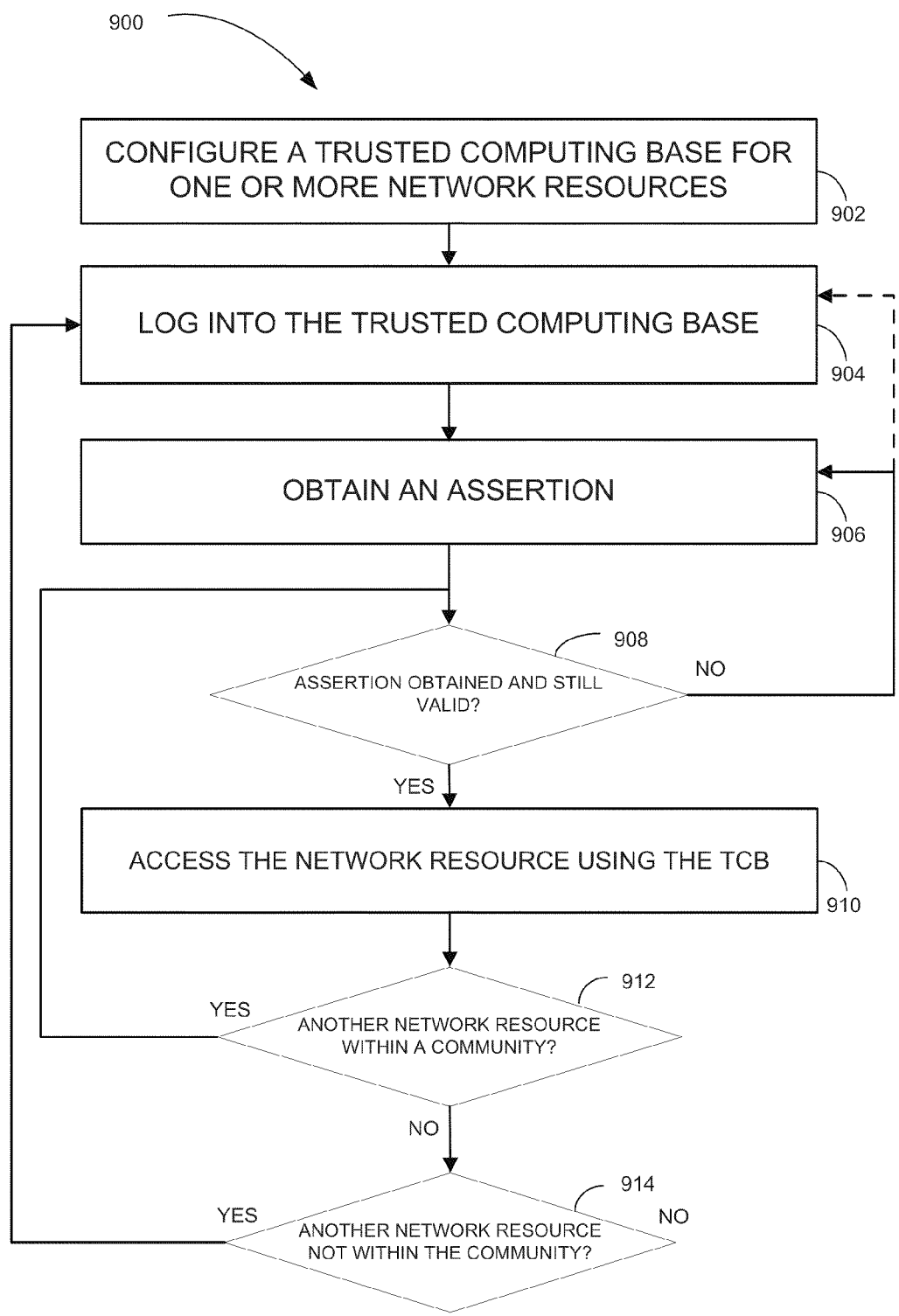
FIG. 9 is a flowchart illustrating a method for access control according to an example embodiment.

Referring to FIG. 9, a method 900 according to an example embodiment for access control is shown. The TCB 301, 404, 802 may be configured to enable access for the one or more network resources 312.1-312.n, 500, 600 at block 902 (see FIGS. 3-6 and 8). For example, the configuration may include connecting to and/or configuring the TCB 301, 404, 802 with the computing system 304, 402. An example embodiment of configuring the TCB 301, 404, 802 for access is described in greater detail below.

Login information may be provided to the TCB 301, 404, 802 at block 904. In an example embodiment, a user of the TCB 301, 404, 802 may provide a user name and password (or pin) to log into the TCB 301, 404, 802, such as directly on the TCB 301, 404, 802 or through use of a computing system. In an example embodiment, a user of the TCB 301, 404, 802 may automatically log into the TCB 301, 404, 802 after the TCB 301, 404, 802 is configured at block 902.

An assertion may be obtained at block 906. For example, the assertion may be a verification or a signed statement that the second factor authentication has been verified. In an example embodiment, the assertion may be obtained from the second factor authentication module 604 of the network resource 600. In an example embodiment, the assertion may be obtained from the second factor authentication module 702 of the shared services resource 700.

In an example embodiment, the assertion may be valid for a duration of the access time period. In an example embodiment, obtaining the assertion may enable access to one or more of the one or more network resources 312.1-312.n, 500, 600.

At decision block 908, a determination is made as to whether the assertion has been obtained and is still valid. In an example embodiment, the assertion may still be valid if the access time period has not expired. In an example embodiment, the assertion may be valid if the assertion was obtained at block 910 and not from an unauthorized source. In an example embodiment, the assertion may have been obtained if the assertion was obtained has authentication information for a selected network resource 312, 500, 600.

If the determination is not valid, the method 900 may return to block 904 or block 906. In an example embodiment, the method 900 may return to block 906 when the assertion is invalid. In an example embodiment, the method 900 may return to block 904 when the method 900 is attempting to obtain a new assertion.

If the assertion has been obtained and is still valid, the network resource 312, 500, 600 may be accessed using the TCB 301, 404, 802 at block 910. An example embodiment of accessing the network resource 312, 500, 600 using the TCB 301, 404, 802 is described in greater detail below.

After the completion of block 910, a user of the TCB 301, 404, 802 may utilize the network resource. For example, the user may conduct e-commerce transactions with the network resource 312, 500, 600, communicate with the network resource 312, 500, 600, or access the network resource 312, 500, 600.

At decision block 912, the method 900 determines whether another network resource 312, 500, 600 within a community is attempting to be accessed. For example, the community may be one or more network resources 312.1-312.n associated with a common resource with a second factor authentication module 604, 702 such as the shared services resource 314, 700 or the network resource 600.

If the method 900 seeks to access another network resource 312, 500, 600 within the community, the method 900 returns to decision block 908. If the method 900 does not seek to access another network resource 312, 500, 600 within the community, the method 900 proceeds to decision block 914.

The method 900 determines whether another network resource 312, 500, 600 outside of the community is attempting to be accessed at decision block 914. If the method seeks to access another network resource 312, 500, 600 outside of the community, the method 900 returns to block 904. If the method 900 does not seek to access another network resource 312, 500, 600 outside of the community, the method 900 may terminate.

Figure 10:
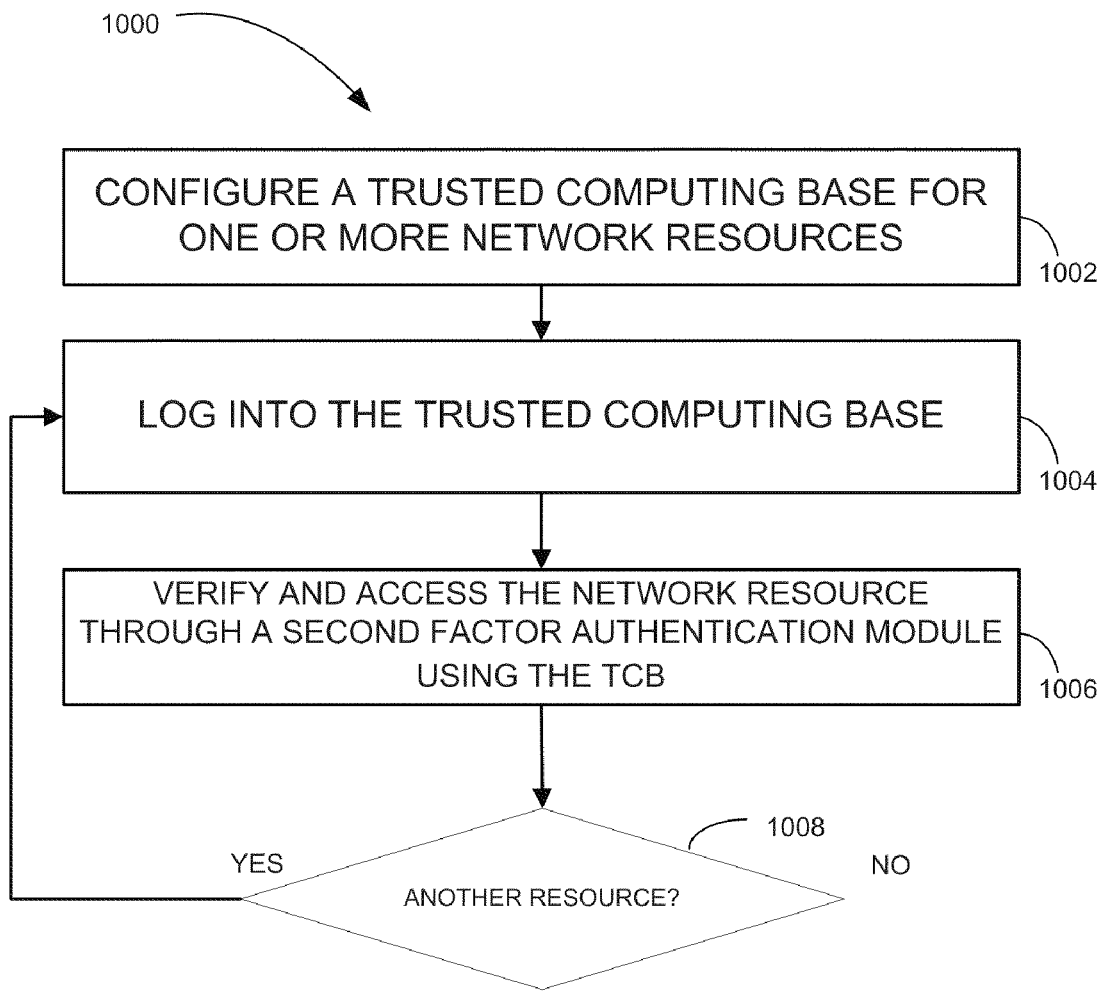
FIG. 10 is a flowchart illustrating a method for access control according to an example embodiment.

Referring to FIG. 10, a method 1000 according to an example embodiment for access control is shown. The TCB 301, 404, 802 is configured for one or more network resources 312.1-312.n, 500, 600 at block 1002 (see FIGS. 3-6 and 8). In an example embodiment, configuring the TCB 301, 404, 802 at block 1002 may be configuring the TCB 301, 404, 802 at block 902 (see FIG. 9). An example embodiment of configuring the TCB 301, 404, 802 for access is described in greater detail below.

Login information may be provided to the TCB 301, 404, 802 at block 1004. In an example embodiment, providing the login information at block 1004 may be providing the login information at block 1004.

The method 1000 may verify and access a particular network resource 312, 500, 600 through the second factor authentication module 604, 702 using the TCB 301, 404, 802 at block 1006. For example, the second factor authentication module 604, 702 may be on the network resource 600 being accessed at block 1006, on a different network resource 600 then the network resource 500 being accessed, or may be accessed through the network resource 500, 600 on the shared services resource 700. In an example embodiment, the TCB 301, 404, 802 may be able to directly access the shared services resource 700. An example embodiment for verifying and accessing the particular network resource 312, 500, 600 is described in greater detail below.

After completion of block 1006, a user of the TCB 301, 404, 802 may utilize the network resource 312, 500, 600. For example, the user of the TCB 301, 404, 802 may utilize the network resource 312, 500, 600 as described for after the completion of block 610.

At decision block 1008, the method 1000 may determine whether access to another resource is being attempted. If access to another resource will be attempted, the method 1000 may return to block 1004. If access to another resource is not being attempted, the method 1000 may terminate.

In an example embodiment, the method 900 (see FIG. 9) may be a synchronous method for access control. In an example embodiment, the method 1000 may be a asynchronous method for access control.

Figure 11:
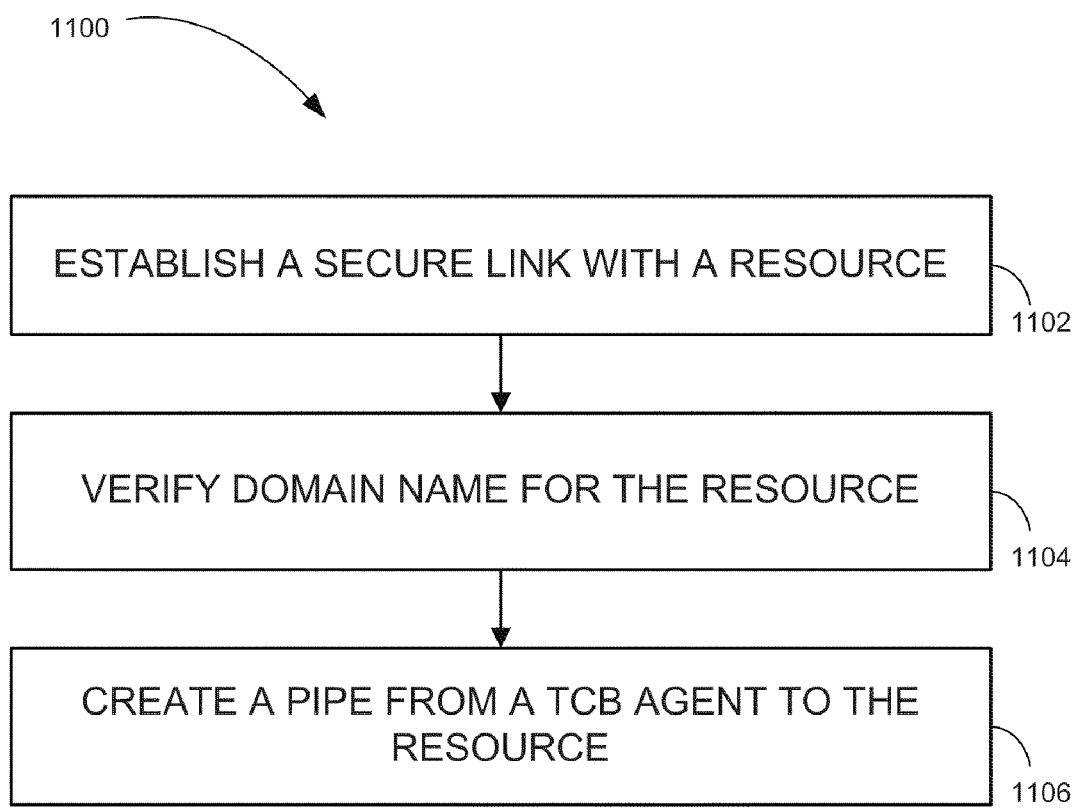
FIG. 11 is a flowchart illustrating a method for creating a pipe for resource access according to an example embodiment.

Referring to FIG. 11, a method 1100 according to an example embodiment for creating a pipe for resource access is shown.

A secure link with the resource 816 (see FIG. 8) may be established at block 1102. For example, establishing the secure link may include connecting the TCB 301, 404, 802 with the resource 816 via secure socket layers (SSL).

A domain name associated with the network resource may be verified at block 1104. In an example embodiment, verifying the domain name may include using domain name system (DNS) to verify the domain name.

A pipe may be created from the TCB agent 406, 804 to the resource 816 at block 1106. In an example embodiment, the pipe may be a secure pipe.

In an example embodiment, creating the pipe may include creating the first pipe 806 from the TCB agent 804 to the host agent 810, creating the second pipe 814 from the host agent 810 to the remote access client 812 and creating the third pipe 820 from the remote access client 812 to the resource 816 (see FIG. 8).

Upon completion of block 1106, the method 1100 may terminate.

Figure 12:
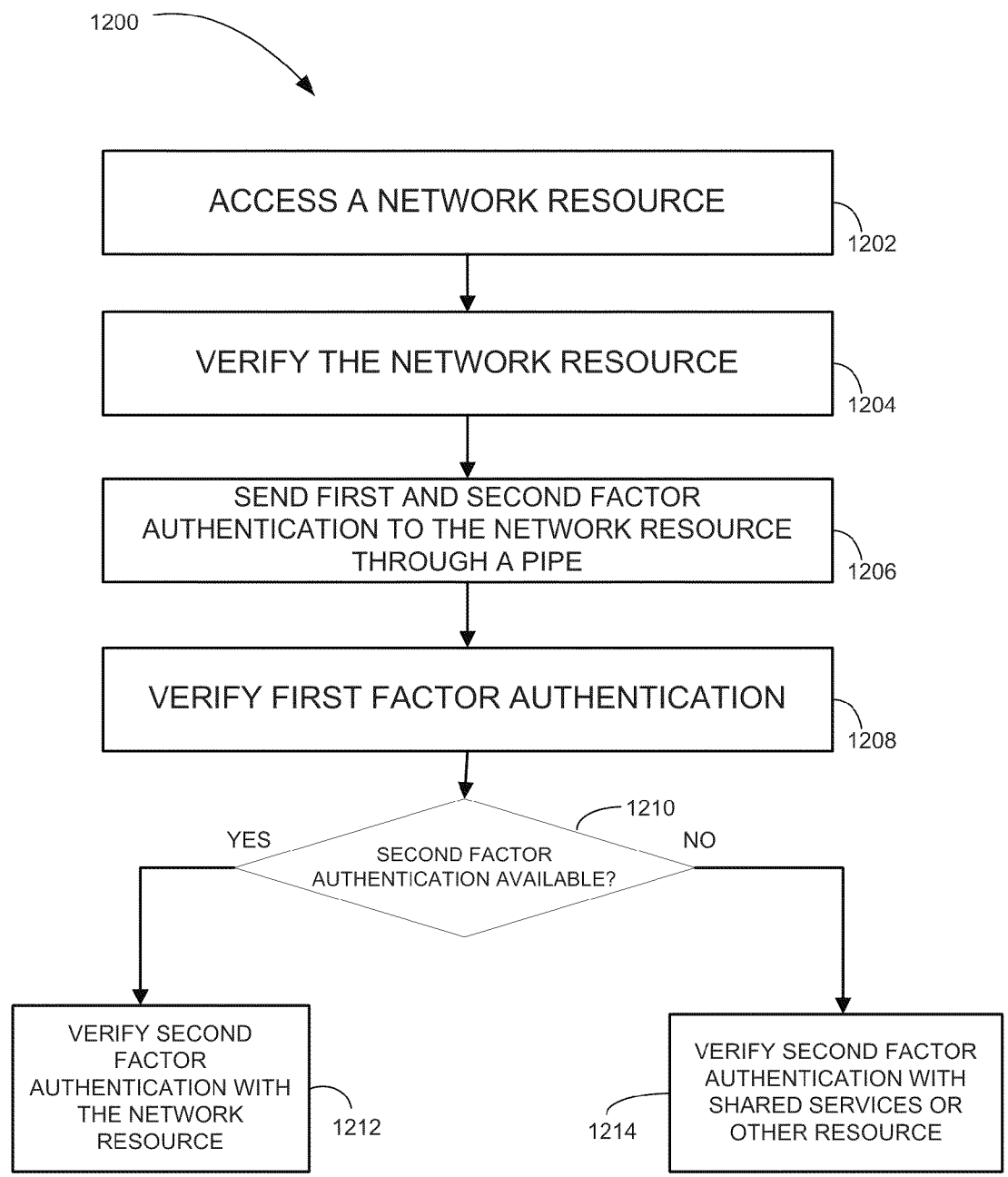
FIG. 12 is a flowchart illustrating a method for network resource access according to an example embodiment.

Referring to FIG. 12, a method 1200 according to an example embodiment for network resource access is shown. For example, block 1006 may include implementing the method 1200 (see FIG. 10).

The network resource 312, 500, 600 may be accessed at block 1202. For example, accessing the network resource 312, 500, 600 may include specifying a particular network resource 312, 500, 600 for which access is desired. In an example embodiment, accessing the network resource 312, 500, 600 may include identifying a location of the network resource 312, 500, 600 on the network 104, 310.

The network resource 312, 500, 600 may be verified at block 1204. In an example embodiment, verifying the network resource 312, 500, 600 may include verifying the network resource 312, 500, 600 using domain name system (DNS). In an example embodiment, verifying the network resource 312, 500, 600 may be utilizing a secure socket layer (SSL) session and verifying a certificate of the network resource 312, 500, 600.

The method 1200 may send the first factor authentication and the second factor authentication from the TCB 301, 404, 802 to the network resource 312, 500, 600 through a pipe at block 1206. For example, the pipe may include the first pipe 806, the second pipe 814 and the third pipe 820 (see FIG. 8).

The first factor authentication may be verified at block 1208. For example, the network resource 312, 500, 600 may verify the login information such as by checking to make sure a provided user name and password are valid.

At decision block 1210, the method 1200 may attempt to obtain verification of the second factor authentication by determining whether second factor authentication is available on the network resource 312, 500, 600 that has been accessed and verified at blocks 1202, 1204. For example, the method 1200 may determine whether the network resource 312, 500, 600 includes the second factor authentication module 604 (see FIG. 6).

If the network resource 312, 500, 600 includes second factor authentication, the method 1200 may verify the second factor resource with the network resource 600 at block 1212. For example, the method 1200 may verify the validity of a certification or may insure that an OTP is correct.

If the network resource 312, 500, 600 does not include second factor authentication, the method 1200 at block 1214 may verify the second factor authentication with an external resource, such as the shared services resource 314, 700 or another network resource 600 with the second factor authentication module 604.

After completion of block 1212 or block 1214, the method 1200 may terminate.

Figure 13:
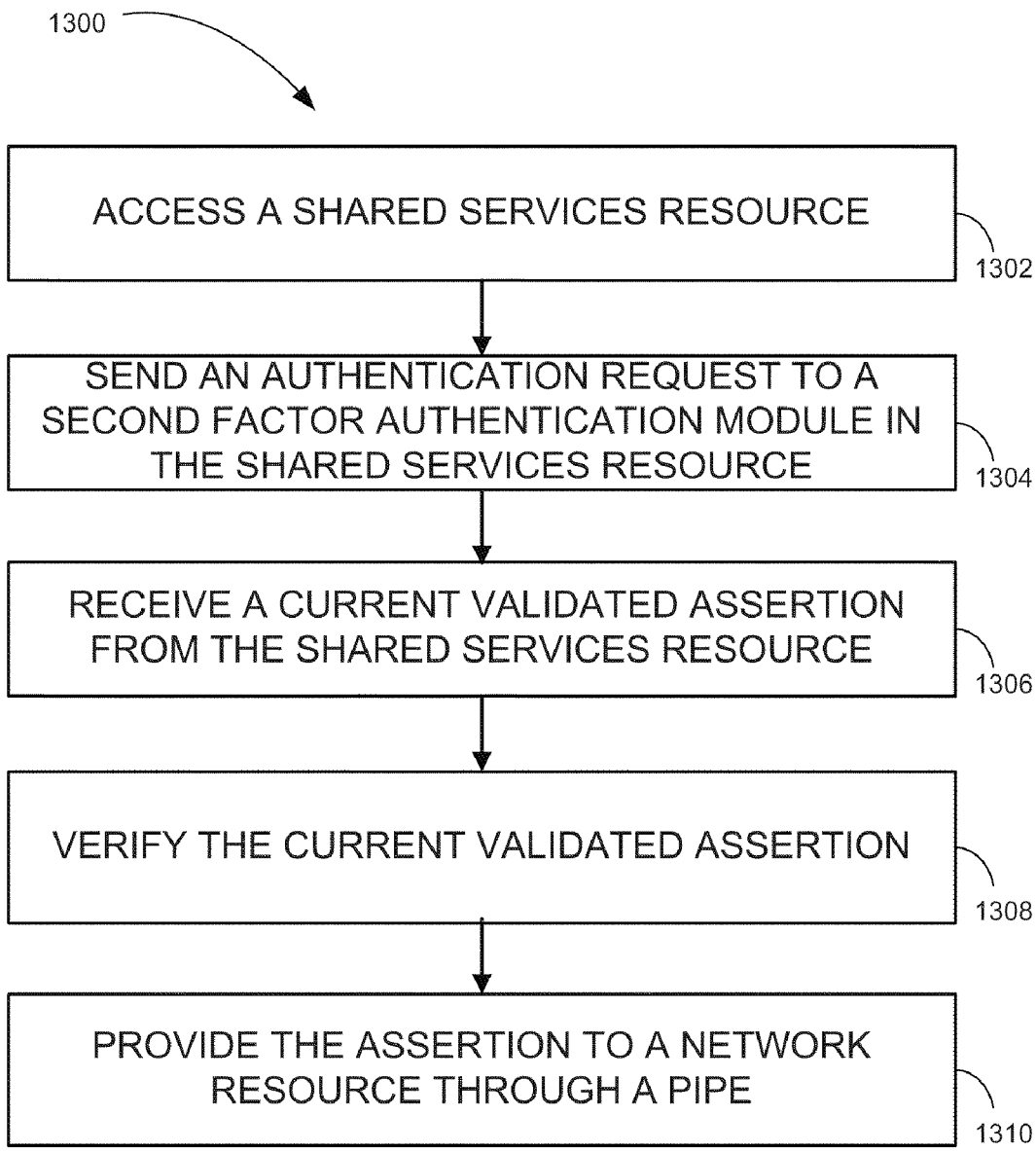
FIG. 13 is a flowchart illustrating a method for network resource access according to an example embodiment.

Referring to FIG. 13, a method 1300 according to an example embodiment for network resource access is shown. For example, block 610 may include the method 1300 (see FIG. 6).

The shared services resource 700 is accessed at block 1302. For example, the shared services resource 700 may be accessed directly from the TCB 301, 404, 802. In an example embodiment, the TCB 301, 404, 802 may include the first factor authentication and the second factor authentication.

An authentication request may be sent to the second factor authentication module 702 in the shared services resource 700 at block 1304. For example, the authentication request may be sent from the TCB 301, 404, 802 over the pipe.

A current validated assertion may be received from the shared services resource 700 at block 1306. For example, the shared services resource 700 may validate the second factor authentication with the second factor authentication module 702 and return the current validated assertion to the TCB 301, 404, 802.

The current validated assertion may be verified on the TCB 301, 404, 802 at block 1308. The assertion may be provided to the network resource 312, 500, 600 through a pipe between the TCB 301, 404, 802 and the network resource 312, 500, 600 at block 1310. Upon completion of block 1310, the method 1300 may terminate.

Figure 14:
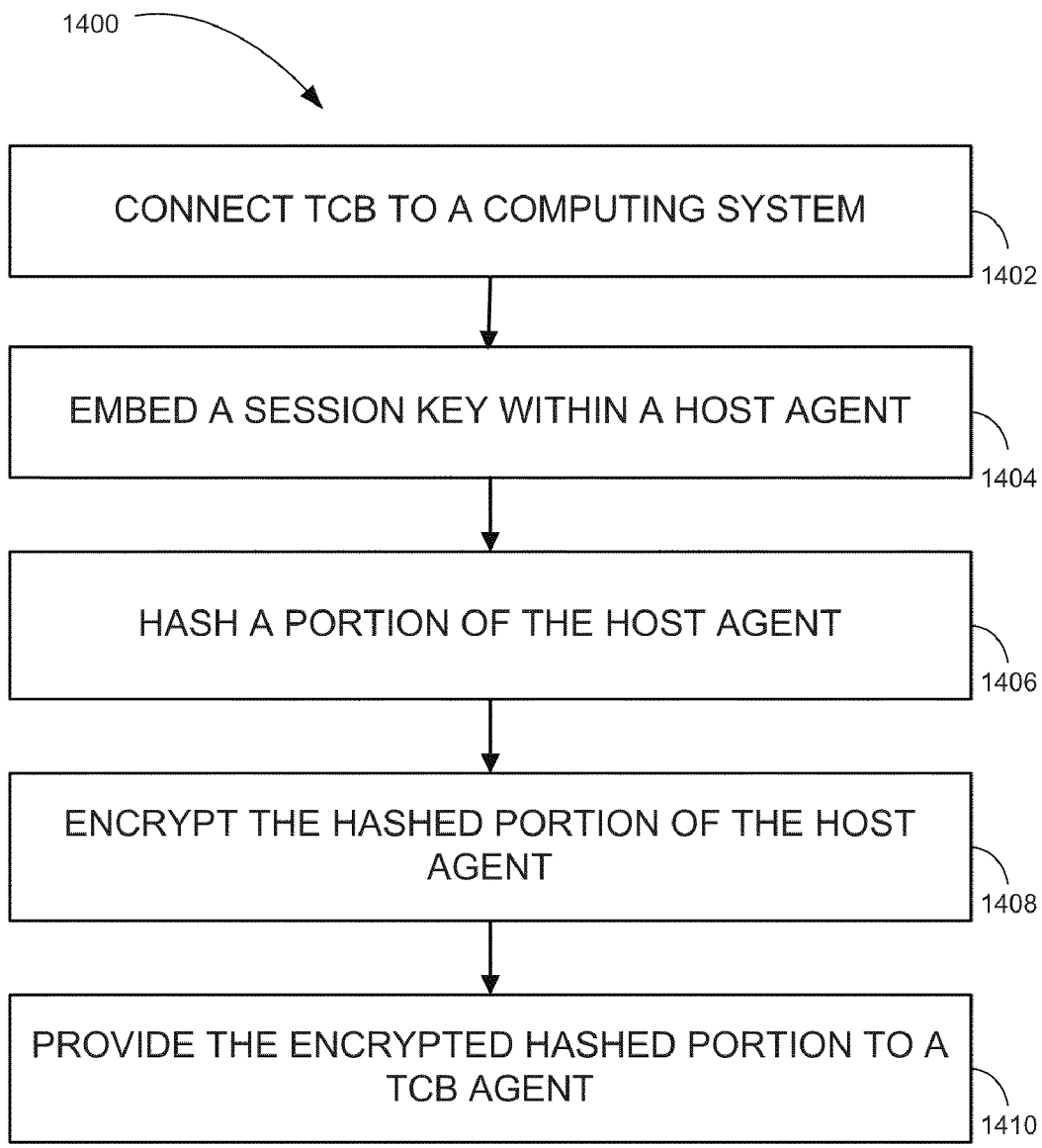
FIG. 14 is a flowchart illustrating a method for configuring a TCB.

Referring to FIG. 14, a method 1400 according to an example embodiment for configuring the TCB 301, 404, 802 is shown (see FIGS. 3-5). The TCB 301, 404, 802 may be connected to the computing system 402 at block 1402. For example, the TCB 301, 404, 802 may be physically, logically or both physically and logically connected to the computing system 402.

A session key may be embedded within the host agent 306, 412, 810 at block 1404. For example, the session key may be generated at block 1402 such as by the host agent 306, 412.

A portion of the host agent 306, 412, 810 may be hashed at block 1406. In an example embodiment, a random or pseudorandom portion of the host agent 306, 412, 810 may be hashed. In an example embodiment, a selected portion of the host agent 306, 412, 810 may be hashed. In an example embodiment, the hash may be performed by a crypto hash function.

The hashed portion of the host agent 306, 412, 810 may be encrypted at block 1408. The encrypted hash portion may be provided to the TCB agent 302, 406, 804 at block 1410. Upon completion of block 1410, the method 1400 may terminate.

Figure 15:
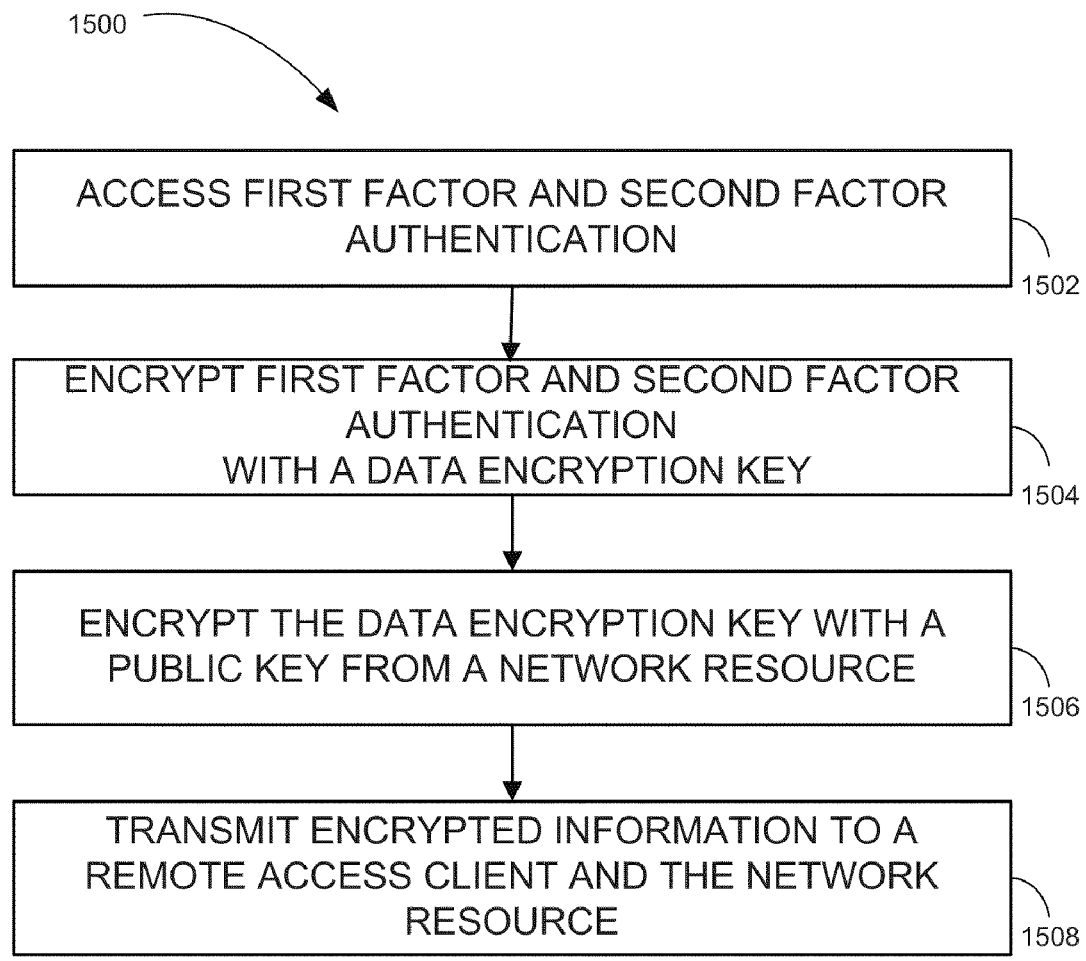
FIG. 15 is a flowchart illustrating a method for creating a pipe to a resource.

Referring to FIG. 15, a method 1500 according to an example embodiment for creating a pipe to a resource is shown. For example, block 1106 may include the method 1500.

The first factor authentication and the second factor authentication are accessed at block 1502. For example, the first factor authentication and the second factor authentication may be accessed by the TCB agent 302, 406 (see FIGS. 3 and 4). The first factor and the second factor may then be encrypted with a data encryption key at block 1504.

The data encryption key may be encrypted with a public key from the resource 816 (see FIG. 8) at block 1506. The encrypted first factor, the encrypted first factor and the encrypted data encryption key may be transmitted to the remote access client 812 and the resource 816 at block 1508.

After completion of block 1508, the method 1500 may terminate.

Figure 16:
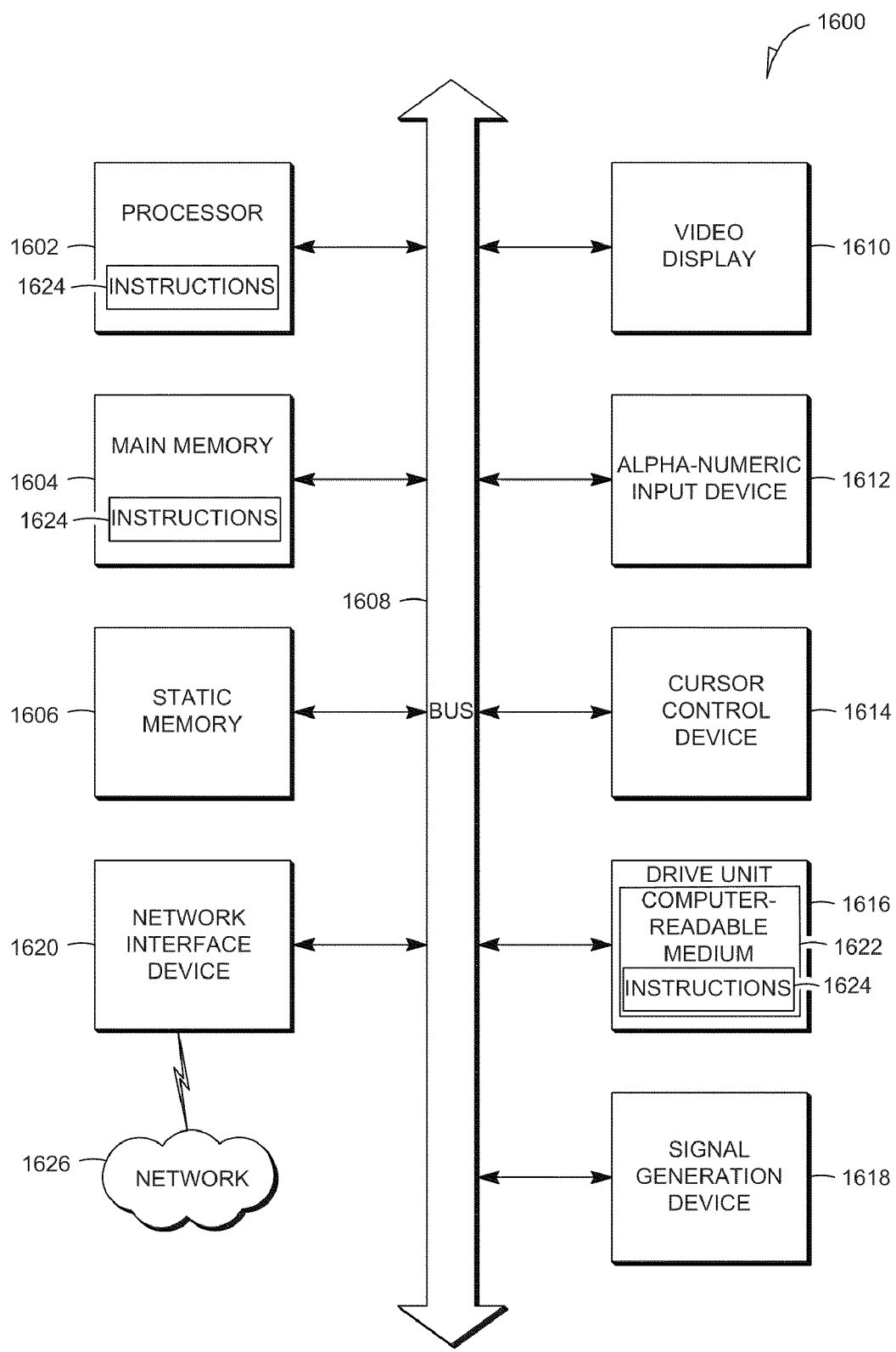
FIG. 16 is a block diagram diagrammatic representation of machine in the example form of a computer system within which a set of instructions, for causing the machine to perform any one or more of the methodologies discussed herein, may be executed.

FIG. 16 shows a diagrammatic representation of machine in the exemplary form of a computer system 1600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1600 includes a processor 1602 (e.g., a central processing unit (CPU) a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard), a cursor control device 1614 (e.g., a mouse), a disk drive unit 1616, a signal generation device 1618 (e.g., a speaker) and a network interface device 1620.

The disk drive unit 1616 includes a machine-readable medium 1622 on which is stored one or more sets of instructions (e.g., software 1624) embodying any one or more of the methodologies or functions described herein. The software 1624 may also reside, completely or at least partially, within the main memory 1604 and/or within the processor 1602 during execution thereof by the computer system 1600, the main memory 1604 and the processor 1602 also constituting machine-readable media.

The software 1624 may further be transmitted or received over a network 1626 via the network interface device 1620.

While the machine-readable medium 1622 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to access authentication have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for authentication comprising:
   a shared services resource to provide a second factor authentication;
   a plurality of network resources, each network resource associated with a respective first factor authentication; and
   a trusted computing base coupled to a computer and configured to communicate with the shared services resource and the plurality of network resources, the trusted computing base to:
   receive a first request from a first network resource of the plurality of network resources, the first request comprising a first respective first factor authentication request;
   provide, using a processor of a machine, a first respective first factor authentication to the first network resource in response to the first request;
   receive a second request from a second network resource of the plurality of network resources, the second request comprising a second respective first factor authentication request and a second factor authentication request; and
   in response to the second request, provide a second respective first factor authentication to the second network resource and provide the second factor authentication to the shared services resource, the shared services resources to verify the second factor authentication and return a validated assertion to the trusted computing base that is subsequently provided to the second network resource to enable a user to access the second network resource.

2. The system of claim 1, wherein the validated assertion is subsequently provided to the second network resource through a pipe.

3. The system of claim 1, wherein the shared services resource is further to return the validated assertion to the second network resource.

4. The system of claim 1, wherein the trusted computing base is further to receive a third request from the first network resource, the third request comprising the first respective first factor authentication request and the second factor authentication request.

5. A method for accessing a resource comprising:
   receiving a first factor authentication and a second factor authentication from a trusted computing base at a network resource;
   verifying, using a processor of a machine, the first factor authentication at the network resource;
   obtaining verification of the second factor authentication from an external source, the external source verifying the second factor authentication and returning a validated assertion to the trusted computing base that is subsequently provided to the network resource; and
   providing a user access to the network resource based on the verifying of the first factor authentication and the verification of the second factor authentication from the external resource.

6. The method of claim 5, wherein obtaining verification of the second factor authentication includes verifying the second factor authentication.

7. The method of claim 5, wherein obtaining verification of the second factor authentication includes providing the second factor authentication to the external resource to verify the second factor authentication.

8. The method of claim 5, further comprising verifying the network resource.

9. The method of claim 5, further comprising configuring the trusted computing base for access to the network resource.

10. The method of claim 9, further comprising creating a pipe between the trusted computing base and the network resource.

11. The method of claim 10, wherein the pipe includes a first pipe between a trusted computing base agent of the trusted computing base and a host agent of a computing system, a second pipe between the host agent and a remote access client of the computing system, and a third pipe between the remote access client and the network resource.

12. A method comprising:
   receiving, at a trusted computing base, a request for at least one access condition;
   determining that the at least one access condition comprises a first factor authentication corresponding to a network resource;
   selecting, from a plurality of stored first factor authentications, the first factor authentication corresponding to the network resource;
   determining that the at least one access condition comprises a second factor authentication from a shared services resource;
   receiving a validated assertion of the second factor authentication from the shared services resource based on the shared services resource having validated the second factor authentication, the shared services resource verifying the second factor authentication and returning a validated assertion to the trusted computing base that is subsequently provided to the network resource;

providing, using a processor of a machine, the validated assertion received from the shared services resource to the network resource to enable a user to access the network resource.

13. The method of claim 12, further comprising verifying a domain name of the network resource at a computer system.

14. The method of claim 12, further comprising creating a pipe between the trusted computing base and the network resource.

15. The method of claim 12, further comprising accessing a further network resource based on only a first factor authentication.

16. The method of claim 12, further comprising:

encrypting the first factor authentication and the second factor authentication with a data encryption key;

encrypting the data encryption key with a public key from the network resource;

transmitting the encrypted first factor authentication, the encrypted second factor authentication, and the encrypted data encryption key from the trusted computing base to a remote access client; and transmitting the encrypted first factor authentication, the encrypted second factor authentication, and the encrypted data encryption key from the remote access client to the network resource.

17. A non-transitory machine-readable storage medium having instruction embodied thereon, which when executed by a machine, cause the machine to perform operations comprising:

receiving a first request from a first network resource, the first request comprising a first respective first factor authentication request;

providing first respective first factor authentication to the first network resource in response to the first request;

receiving a second request from a second network resource, the second request comprising a second respective first factor authentication request and a second factor authentication request; and providing a second respective first factor authentication to the second network resource and a second factor authentication to the shared services resource, the shared services resource to verify the second factor authentication and return a validated assertion to the trusted computing base that is subsequently provided to the second network resource to enable a user to access the second network resource.

18. The machine-readable storage medium of claim 17, wherein the operations further comprise verifying a domain name of the network resource.

19. The machine-readable storage medium of claim 17, wherein the operations further comprise creating a pipe between the trusted computing base and the network resource.

* * * * *